Patented June 17, 1952

2,600,431

UNITED STATES PATENT OFFICE 2,600,431

ADDUCT OF THIOUREA AND CHLOROPICRIN AND ITS USE AS A PESTICIDE

Ludwig Rosenstein and Manuel H. Gorin, San Francisco, Calif.

No Drawing. Application June 17, 1950, Serial No. 168,836

8 Claims. (Cl. 167—22)

This invention relates to a new composition of matter consisting of a solid adduct between thiourea and chloropicrin, useful generally as a fumigant.

Chloropicrin is a highly toxic, highly irritating liquid which has found considerable use as a fumigant for grains and their products, for dried and fresh fruit and seeds, rat control, soil fumigation, and against scale pests on citrus trees. Because the material is a liquid, certain handling, distribution and application hazards and difficulties are inherent and have heretofore restricted the use of chloropicrin. We have found that when thiourea in solid phase is brought into contact with chloropicrin, an adduct is formed which has certain useful and valuable properties. The adduct of this invention is a finely divided solid of low density. From this solid chloropicrin is relatively slowly and uniformly released as a vapor to leave behind solid thiourea having an expanded lattice form such that the thiourea is active. For example, with this active thiourea, the chloropicrin adduct may be readily reformed by bringing the active thiourea into contact with additional chloropicrin.

To form our new product it is only necessary to bring the thiourea and chloropicrin into contact with one another under conditions conducive to formation of the adduct. This can be done very readily and simply by suspending ordinary crystalline thiourea in an excess of liquid chloropicrin and agitating at room temperature. Adduct formation commences almost immediately and formation of the adduct is complete with a relatively short time.

The nature of our invention may be more fully understood by the following specific example which is set forth by way of illustration only:

10 grams of crystalline thiourea were suspended in 50 cc. of chloropicrin and the mixture agitated for thirty minutes at room temperature. After ten minutes, the thiourea had expanded to occupy almost completely the liquid volume. The agitation was continued for another twenty minutes and the mixture then filtered. The solid phase was spread out in a thin layer to dry at room temperature for one-half hour and then weighed. The weight of the adduct was 16.4 grams. Thus the adduct has a mol ratio of thiourea to chloropicrin of about 3.7 to 1.

To employ the chloropicrin-thiourea adduct, for example, as a grain fumigant, the adduct is placed in individual bags of suitable permeability to chloropicrin vapors and placed in an elevator at various levels. From the bags, the chloropicrin vapor is released at a slow and uniform rate during the storage of the grain. When depleted or reduced in chloropicrin content, the bags are removed from the elevator and the thiourea-chloropicrin adduct reformed by pouring liquid chloropicrin upon the active thiourea remaining in the bags.

The adduct can be employed in various carriers as desired if its dilution or extension is helpful to application against any pest. For example, the adduct can be admixed with a powder and applied as a dust to citrus trees against scale pests. The adduct has a strong tendency to adhere to surfaces and since it is quite finely divided, it adheres in an even film on the leaves. From this film a relatively high concentration of chloropicrin vapor will be found in the immediate neighborhood of the leaf, where the fumigant is required. The finely divided adduct can also be employed in an oil emulsion, being carried as a fine solid in the dispersed oil phase.

The chloropicrin-thiourea adduct can be spread as a thin dust layer on top of the soil in an area infested with nematodes or similar pests and then plowed in when the land is prepared for planting. From this adduct, the chloropicrin is released considerably more slowly than when liquid chloropicrin is used and thus can be used more effectively and economically. In addition, the thiourea adds nitrogen to the soil, thus providing an added fertilizer value.

Various other uses and compositions will readily suggest themselves to those familiar with chloropicrin for the present material provides a new, novel and useful source of this valuable material.

We claim:

1. The solid complex of thiourea and chloropicrin.

2. The process of forming a solid complex of thiourea and chloropicrin comprising agitating solid thiourea with an excess of chloropicrin to form a solid complex thereof, separating the solid complex from the chloropicrin excess, and drying the separated solid complex.

3. As a composition of matter a solid complex of thiourea and chloropicrin in a carrier.

4. As a composition of matter a solid complex of thiourea and chloropicrin in finely divided form in a powder as a carrier.

5. As a composition of matter a solid complex of thiourea and chloropicrin distributed as a powder in an oil phase of an aqueous emulsion wherein oil provides a dispersed phase as a carrier for the powdered complex.

6. The process of forming a solid complex of thiourea and chloropicrin comprising contacting solid thiourea and chloropicrin and recovering the solid complex formed.

7. In a pest control method, the step of distributing about a pest habitat a fiinely divided solid complex of thiourea and chloropicrin.

8. In a pest control method, the step of distributing about a pest habitat a finely divided solid complex of thiourea and chloropicrin in a carrier therefor.

LUDWIG ROSENSTEIN.
MANUEL H. GORIN.

REFERENCES CITED

The following references are of record in the file of this patent:

UNITED STATES PATENTS

| Number | Name | Date |
|---|---|---|
| 2,520,716 | Fetterly | Aug. 29, 1950 |

OTHER REFERENCES

Macbeth et al.: "J. Chem. Soc." (London), 1932, pp. 541 and 542.

Angla: "Comptes Rendus," vol. 24, February 10, 1947, pp. 403 and 404.

Strand University of Minnesota Agr. Ext. Div. Special Bulletin No. 102, entitled, "Chloropicrin, New Fumigant for Mill and Household Insects," January 1926, pp. 1–19.

Hoskins et al.: J. Econ. Ent., vol. 33, No. 6, December 1940, pp. 875–881.